May 18, 1965 F. R. FISCHER ETAL 3,183,694
ASSEMBLY MECHANISM
Filed Sept. 8, 1961 10 Sheets-Sheet 7

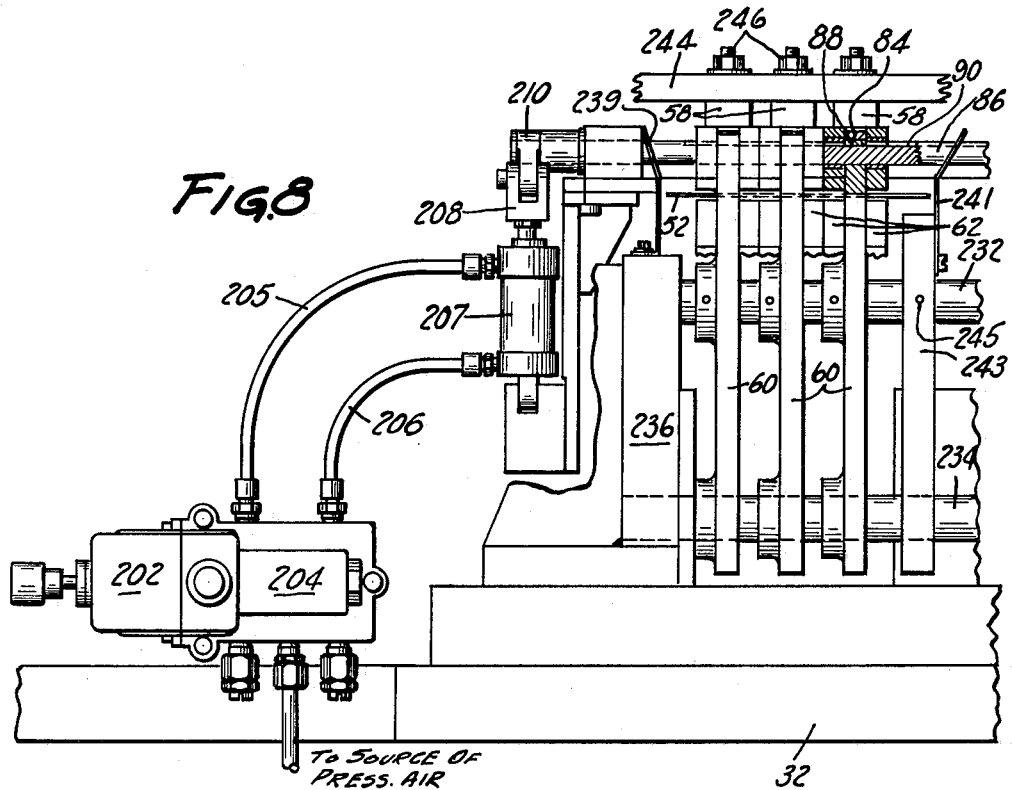
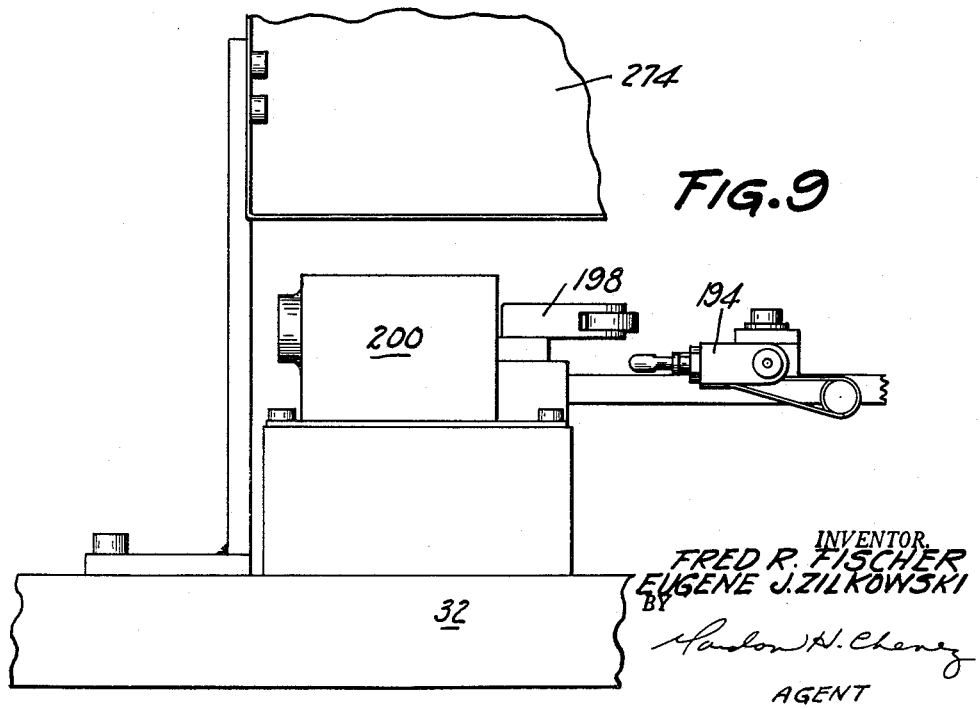

INVENTOR.
FRED R. FISCHER
EUGENE J. ZILKOWSKI
BY
AGENT

May 18, 1965  F. R. FISCHER ETAL  3,183,694
ASSEMBLY MECHANISM
Filed Sept. 8, 1961   10 Sheets-Sheet 10

INVENTOR.
FRED R. FISCHER
EUGENE J. ZILKOWSKI
BY
AGENT

United States Patent Office 3,183,694
Patented May 18, 1965

1

3,183,694
ASSEMBLY MECHANISM
Fred R. Fischer and Eugene J. Zilkowski, South Bend,
Ind., assignors to The Bendix Corporation, South Bend,
Ind., a corporation of Delaware
Filed Sept. 8, 1961, Ser. No. 136,891
5 Claims. (Cl. 72—22)

This invention relates to apparatus for assembling a plurality of stamped articles and an associated connecting member to thereby produce an integrated unit.

The main object of this invention is to provide automatically operable mechanical means for assembling a plurality of stamped articles and a connecting member to thereby produce an integrated unit of manufacture without the need for manual handling of the articles and connecting member during the assembly operation.

The present invention is applicable in principle to various items of manufacture other than that shown and described hereinafter wherein separately stamped sheet metal hook and eye members are secured to a connecting cable to form a force transmitting link useful, for example, in an automobile automatic brake adjuster mechanism such as disclosed in Patent No. 2,978,072 issued to R. T. Burnett (common assignee).

The present invention permits mechanical assembly of articles of manufacture thereby reducing both the cost and time previously required for producing the same by hand operation.

Other objects and advantages of the present invention will become apparent to those persons skilled in the art from the following description taken in conjunction with the accompanying drawings wherein:

FIGURE 8 is a front elevation view of a portion of FIGURE 1;

FIGURE 9 is a sectional view taken on line 9—9 of FIGURE 1;

2

Figure 1:
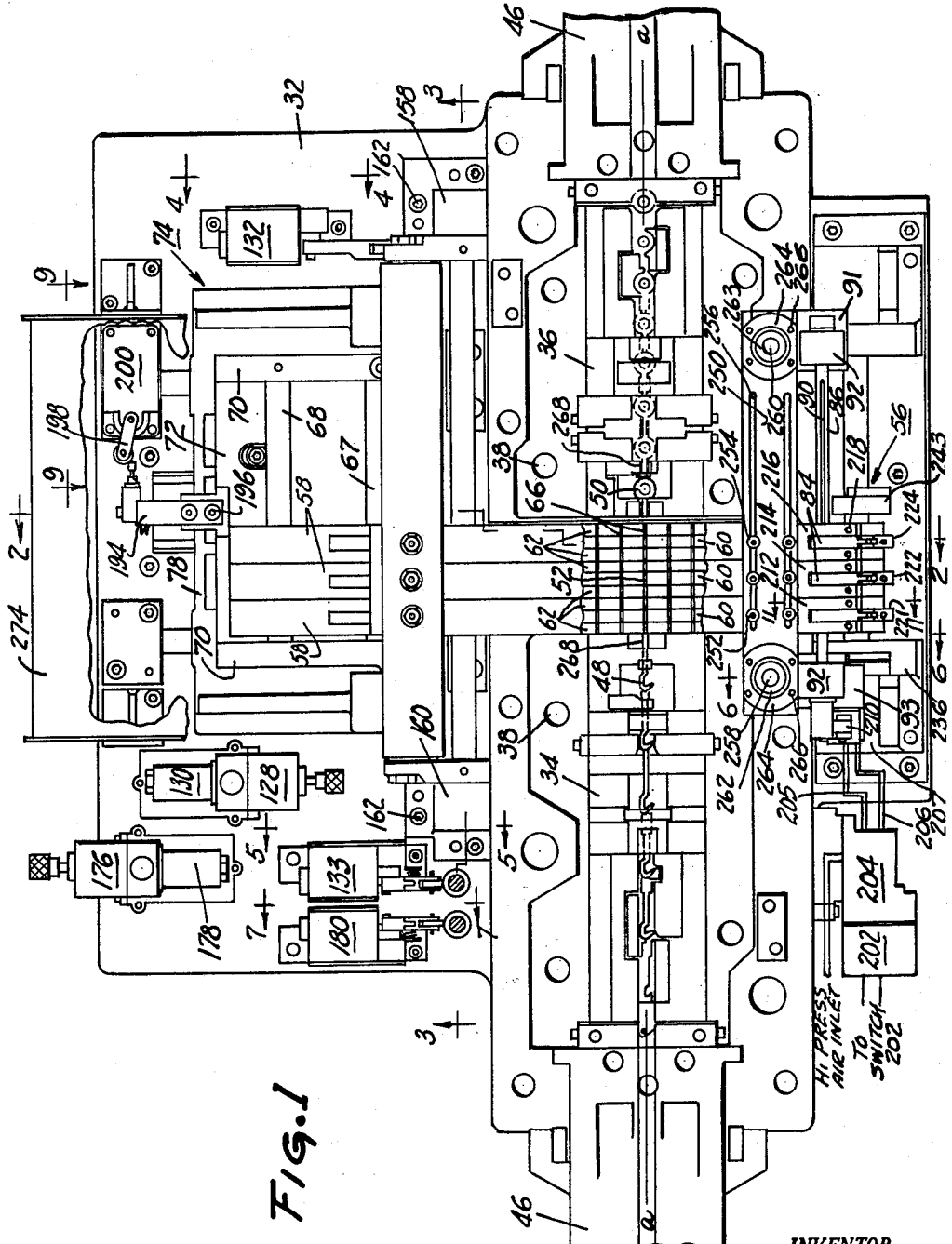
FIGURE 1 is a plan view of the present invention shown in somewhat schematic form.

Referring to the drawings and in particular FIGURE 1 thereof, there is shown a conventional stamping press which includes a lower fixed base 32 upon which spaced apart lower die blocks 34 and 36 are fixedly secured by suitable fastening means 38 and an upper power operated ram portion 40 upon which spaced apart upper die blocks, not shown, are fixedly secured. Die blocks 34 and 36 are aligned on axis a—a and are each supplied strip stock from a continuous roll of strip steel, not shown, by associated automatic feed means 46. The lower die blocks 34 and 36 and associated upper die blocks cooperate in a conventional stamping operation to progressively stamp hook member 48 and eye member 50 to shape, as shown, which members are subsequently joined by a wire cable 52, the resulting assembly forming a force transmitting link.

Figure 2:
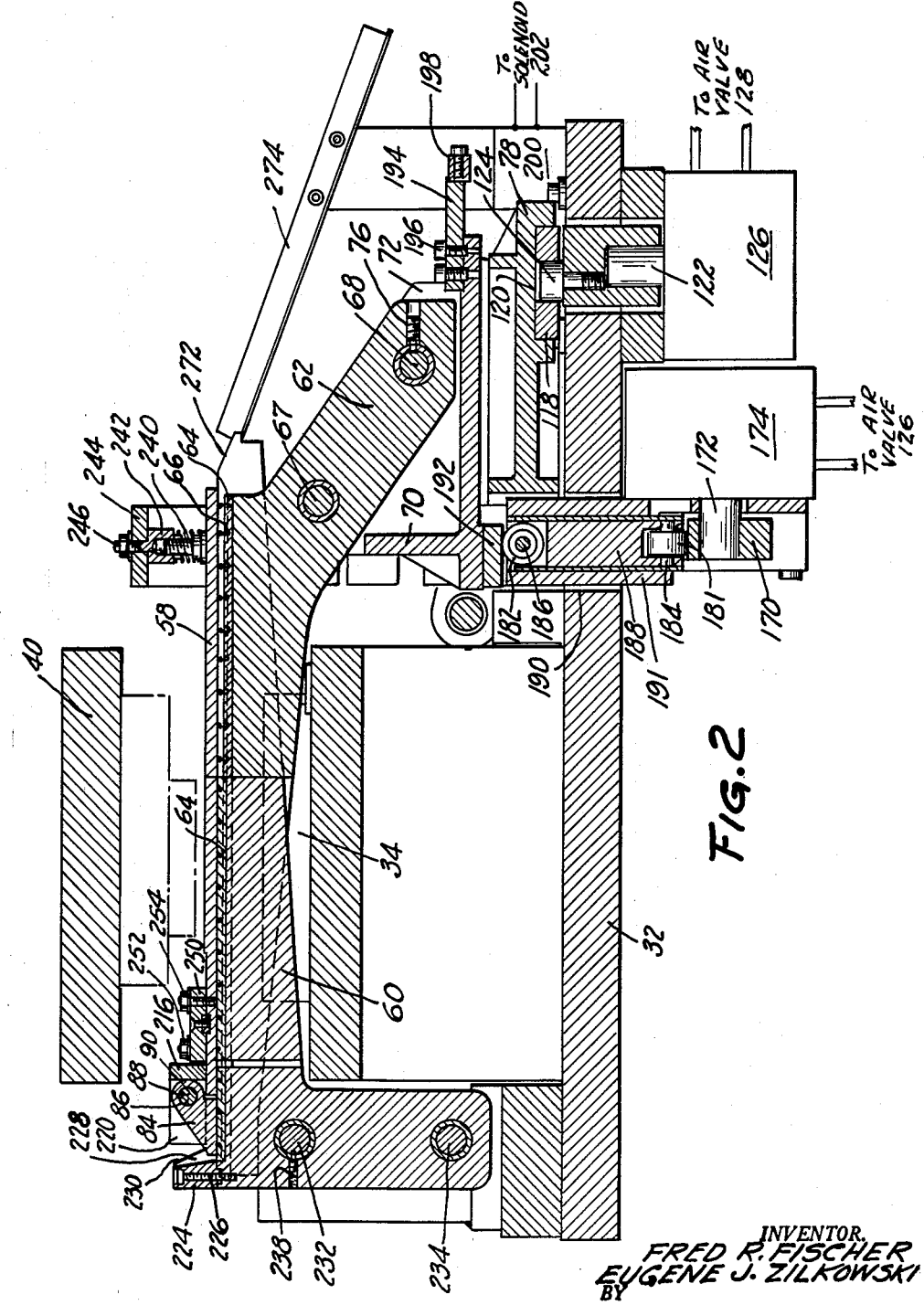
FIGURE 2 is a sectional view taken on line 2—2 of FIGURE 1.

The present invention includes automatically operated mechanism for feeding the wire cable 52 of predetermined length into position relative to hook and eye members 48 and 50 to facilitate a final stamping operation which simultaneously effects clamping of the hook and eye members 48 and 50 to opposite ends of the wire cable 52 and severs the hook and eye members 48 and 50 from the strip stock. To this end, there is provided cable feed mechanism generally indicated by 56 which is mounted on base 32 between die blocks 34 and 36. As viewed in FIGURE 1 which represents a top view of the press with the ram portion of the press removed, a plurality of horizontally extending rectangular plates 58 are arranged lengthwise at right angles to the axis a—a and are shown partially cut away to expose underlying vertically extending parallel fixed plates 60 which are flanked by vertically extending parallel movable plates 62. Referring to FIGURE 2, the fixed and movable plates 60 and 62 are each provided with a plate 64 having equally spaced cable receiving recesses 66 and being fixedly secured to the associated upper surface of the fixed and movable plates by any suitable fastening means, not shown.

The movable plates 62 are slidably supported on shafts 67 and 68 which are fixedly secured to webs 70 integral with an upper frame member 72 of a two part frame or carriage 74. The movable plates 62 are adjustable along shafts 67 and 68 and are locked in a given position by set screws 76 threadedly engaged with the movable plates and engageable with shaft 68. The second part or lower frame member 78 of the two part frame 74 is slidably supported on horizontally arranged shafts 80 and 82 which extend at right angles to the axis a—a of the die blocks 34 and 36. The shafts 80 and 82 guide lower frame member 78 toward and away from a plurality of cable engaging levers 84 each of which are secured to a shaft 86 by a key 88 and slot 90 arrangement (FIGURE 2) which permits levers 84 to be adjustably positioned axially but prevents relative rotational movement between shaft 86 and levers 84. The shaft 86 is suitably journaled at its opposite ends in bearings, not shown, which, in turn, are fixedly secured to support members 91 and 93 by clamps 92.

Figure 3:
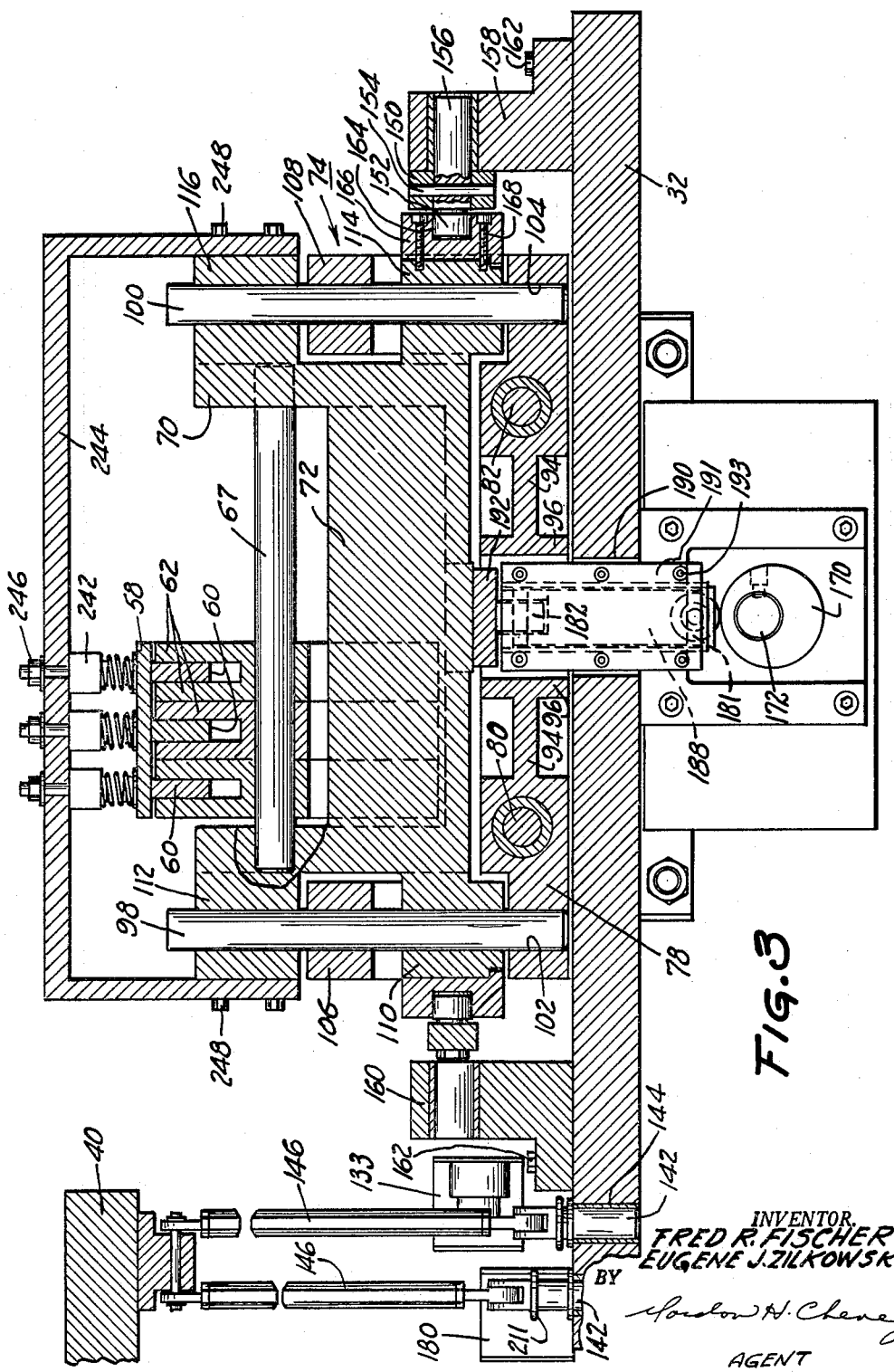
FIGURE 3 is a sectional view taken on line 3—3 of FIGURE 1.

Referring to FIGURE 3, the lower frame member 78 includes a plurality of horizontal and vertical webs 94 and 96, respectively. Vertically extending shafts 98 and 100 are fixedly secured in openings 102 and 104, respectively, formed in lower frame member 78 by any suitable means such as a press fit and extend through projecting portions 106 and 108, respectively, integral with lower frame member 78. Upper frame member 72 is provided with integral spaced apart projecting portions 110, 112 and 114, 116 which are bored to receive shafts 98 and 100, respectively, upon which the upper frame member 72 slides vertically. Referring to FIGURE 2, the movement of lower frame member 78 toward and away from levers 84 is controlled by an eccentrically actuated roller 118 which rides in a recess 120 formed in lower frame member 78 and which is attached to a motor driven shaft 122 by a bolt 124 suitably connected off-center therefrom. The shaft 122 is driven by any suitable motor as for example air operated motor 126, the operation of which is controlled by air valve 128, solenoid 130 and electrical switches 132 and 133, as will be described hereafter. Motor 126 is fixedly secured to base 32 by any suitable fastening means, not shown.

Figure 5:
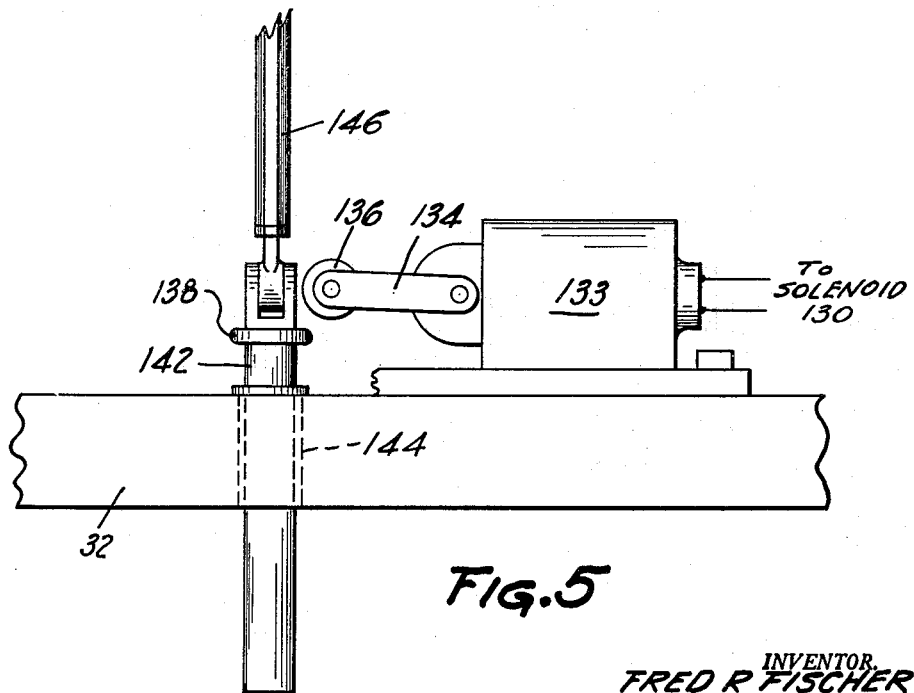
FIGURE 5 is a sectional view taken on line 5—5 of FIGURE 1.

Referring to FIGURE 5, the electrical switch 133 is provided with actuating lever 134 which carries a roller 136 which is contacted by an annular projection 138 formed on a rod 142 slidably carried for vertical movement in an opening 144 in base 32. The rod 142 is pivotally connected to and actuated by a rod 146 suspended from the ram portion 40. Upward movement of the ram portion 40 from its uppermost position results in annular projection 138 contacting roller 136 to thereby actuate switch 133.

Figure 4:
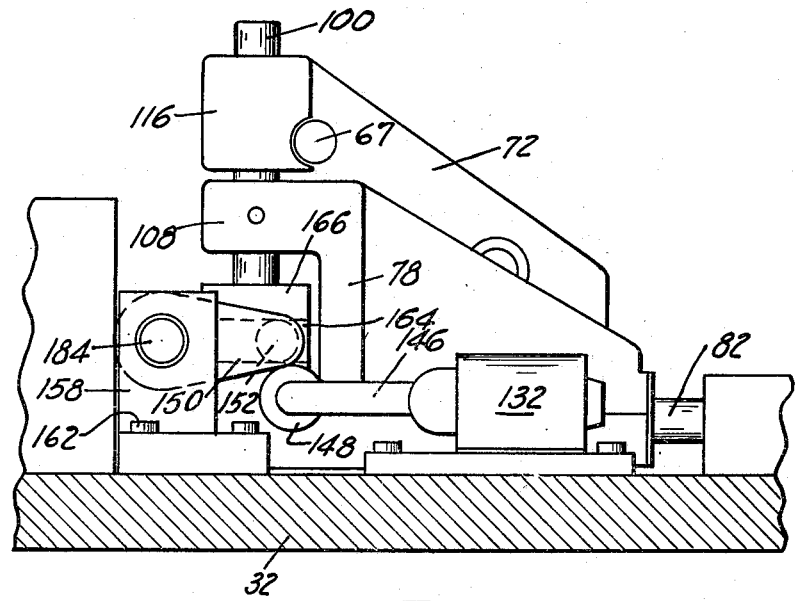
FIGURE 4 is a sectional view taken on line 4—4 of FIGURE 1.

Referring to FIGURES 3 and 4, the electrical switch 132 is provided with a spring loaded actuating lever 146 which carries a roller 148 rotatably mounted on its free end. The roller 148 is contacted by a lever 150, one end of which carries a roller 152 rotatably mounted thereon and the opposite end of which is fixedly secured by pin 154 to a shaft 156 suitably journaled at opposite ends in support members 158 and 160, respectively. The support members 158 and 160 are fixedly secured to base 32 by bolts 162. The roller 152 rides in a horizontal slot 164 formed in a plate member 166 which is fixedly secured to projecting portion 114 by bolts 168. It will be noted that the lever 150 is stationary during horizontal movement of the upper and lower frame members 72 and 78 by virtue of the roller 152 following the horizontal slot 164. However, vertical movement of the upper frame member 72 will result in corresponding vertical movement of roller 152 which, in turn causes lever 150 to pivot about the axis of shaft 156 thereby actuating the roller 148 causing movement of actuating lever 146.

Figure 6:
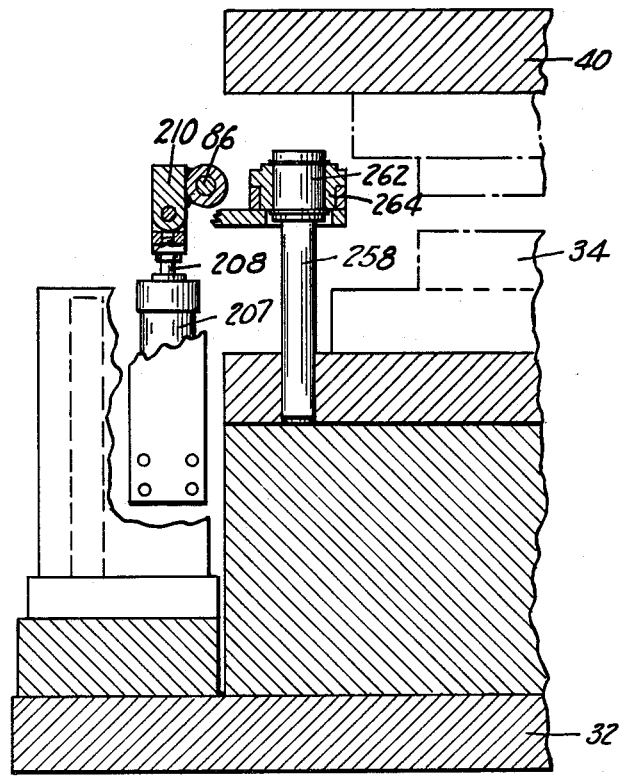
FIGURE 6 is a sectional view taken on line 6—6 of FIGURE 1.
Figure 7:
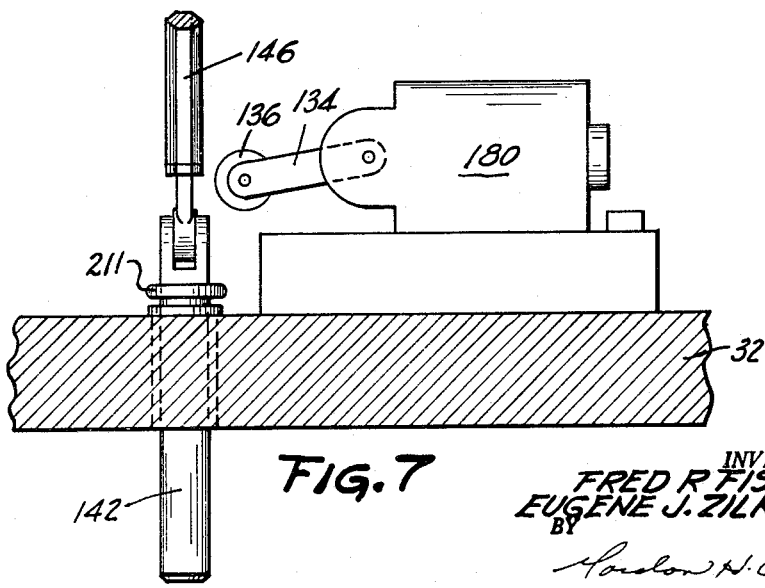
FIGURE 7 is a sectional view taken on line 7—7 of FIGURE 1.
Figure 10:
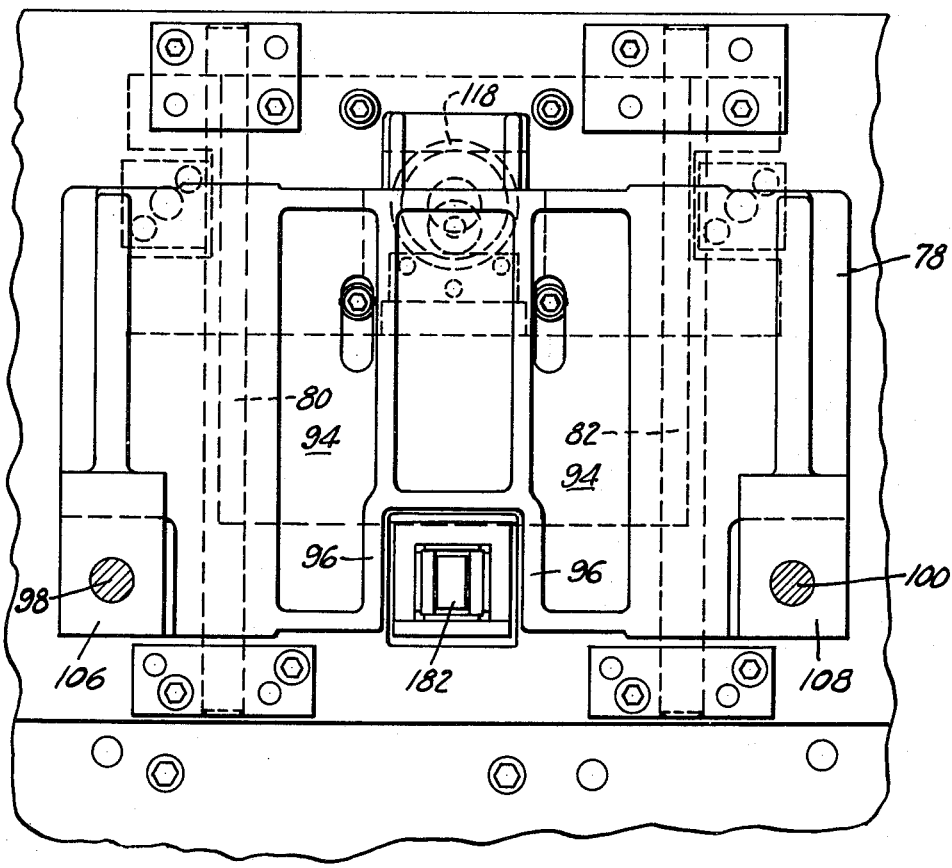
FIGURE 10 is a plan view of the two part frame of FIGURE 1.
Figure 15:
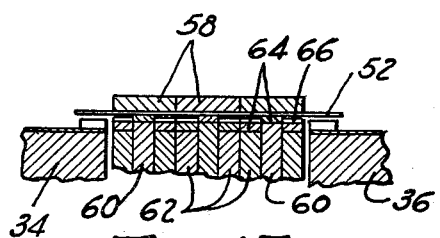
FIGURE 15 is a sectional view taken on line 15—15 of FIGURE 14 showing the movable plates in an up position.
Figure 16:
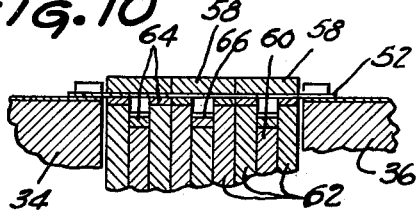
FIGURE 16 is a sectional view taken on line 16—16 of FIGURE 11 showing the movable plates in a down position.

With reference to FIGURES 2 and 3, the vertical movement of upper frame member 72 is controlled by a cam 170 fixedly secured to shaft 172 of a motor 174 which is controlled by an air valve 176, solenoid 178, and electrical switch 180. Motor 174 is fixedly secured to base 32 by any suitable fastening means, not shown. Motion of the cam 170 is transmitted to upper frame member 72 via follower mechanism which includes rollers 181 and 182 rotatably mounted on shafts 184 and 186 arranged at right angles to each other and secured to opposite ends of an elongated member 188 slidably mounted for lengthwise movement in an opening 190 in base 32. A cover plate 191 fixedly secured to base 32 by bolts 193 holds member 188 in position in opening 190. The roller 182 rides against a wear plate 192 fixedly secured to the lower surface of upper frame member 72 by any suitable fastening means, not shown. An arm 194 fixedly secured to upper frame member 72 by bolts 196 is adapted to engage an arm 198 which actuates an electrical switch 200 fixedly secured to base 32 (FIGURE 9) which switch, in turn, is connected to a solenoid 202 (FIGURE 1) which actuates a valve 204. The valve 204 controls the flow of air through passages 205 and 206 to an air operated motor 207 having a piston, not shown, slidable therein which actuates a rod 208 pivotally connected to arm 210 fixedly secured to shaft 86 (FIGURE 6). The electrical switch 180 is, like switch 133, provided with an actuating lever 134 and roller 136 which is contacted by an associated annular projection 211 on rod 142 which is slidably carried in base 32 and connected to ram portion 40 via rod 146 (FIGURE 7). Downward movement of the ram portion 40 from its lowermost position results in annular projection 211 contacting roller 136 to thereby actuate switch 180.

In FIGURE 1, the shaft 86 is journaled in support members 212, 214, and 216 which are fixedly secured to the movable plates 62 by bolts 218 and which are provided with recesses 220 which receive cable engaging levers 84. Cable guide members 221, 222, and 224 fixedly secured to fixed plates 60 by bolts 226 are in the plane of recesses 220 and are provided with recesses 228 (FIGURE 2) which receive the end portions of the cable engaging levers 84. The side walls of the guide members 221, 222, and 224 are provided with sloping surfaces 230 which guide the cable 52 into position relative to the cable receiving recesses 66.

In FIGURE 8, the fixed plates 60 are slidably carried by shafts 232 and 234 arranged parallel to axis $a—a$ and fixedly secured at the ends thereof to support members 236 which are fixedly secured to base 32. The fixed plates 60 are adjustably secured to shafts 232 and 234 and may be positioned relative to one another along said shafts as will be explained hereinafter. Set screws 238 threadedly engaged with plates 60 lock the plates 60 in the desired position along shafts 232 and 234. Cable 52 is guided axially into the cable guide members 221, 222, and 224 by spaced apart adjustable sheet metal guide members 239 and 241 which are fixedly secured to support members 236 and 243, respectively, by suitable fastening means. The support member 241 is slidably carried on shafts 232 and 234 and is fixedly secured in any desired position along shafts 232 and 234 by means of a set screw 245.

The plates 58 (FIGURES 2 and 3) are each biased into engagement with the upper surfaces of fixed and movable plates 60 and 62 by an associated compression spring 240 interposed between the plate 58 and a cup-shaped spring retainer 242 fixedly secured to a U-shaped bracket 244 by fastening members 246. The bracket 244 is fixedly secured to upper frame member 72 by bolts 248 (FIGURE 3). The plates 58 (FIGURE 1) are adjustably secured to a plate 250 and locked in position thereon by nuts 252 which engage cooperating bolts 254 slidably carried in slots 256 in plate 250. The plate 250 is slidably mounted on vertically extending shafts 258 and 260 which are fixedly secured to base 32. Bearings 262 and 263 slidably engaged with shafts 258 and 260, respectively, are held in position on plate 250 by associated clamps 264. Bolts 266 fixedly secure the clamps 264 and plate 250 in position on support members 91 and 93.

*Operation*

The operation of the press 30 and the stamping sequence whereby hook member 48 and eye member 50 are stamped to shape progressively is conventional and will be readily understood by those persons skilled in the art. In general, the strip steel is fed along axis $a—a$ from the receiving ends of the die blocks 34 and 36 by the automatic feed mechanism 46 which is controlled in response to vertical movement of the ram portion 40 by any suitable means such as cam members or equivalent structure attached to ram portion 40. The automatic feed mechanism 46 is conventional in design and operation and forms no part of the present invention. Assuming that the last stamping operation which includes crimping of flanges 268 formed on hook and eye members 48 and 50 over the associated ends of cable 52 and severing the hook and eye members from their associated steel strip, has yet to be accomplished, the ram portion 40 will be on its up stroke whereby the feed mechanism will cause the strips of steel to advance one-half the distance between adjacent die.

Figure 11:
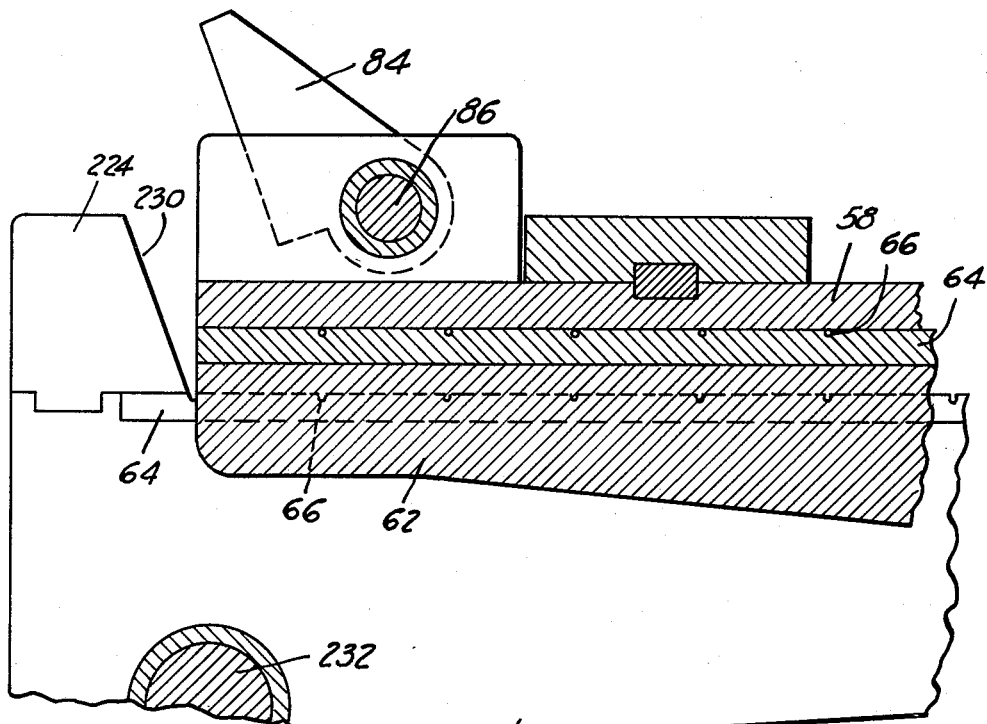
FIGURE 11 is a sectional view taken on line 11 of FIGURE 1 and enlarged to show the relative positions of the members forming applicants' cable feeding mechanism at one point during the cycle of operation.
Figure 12:
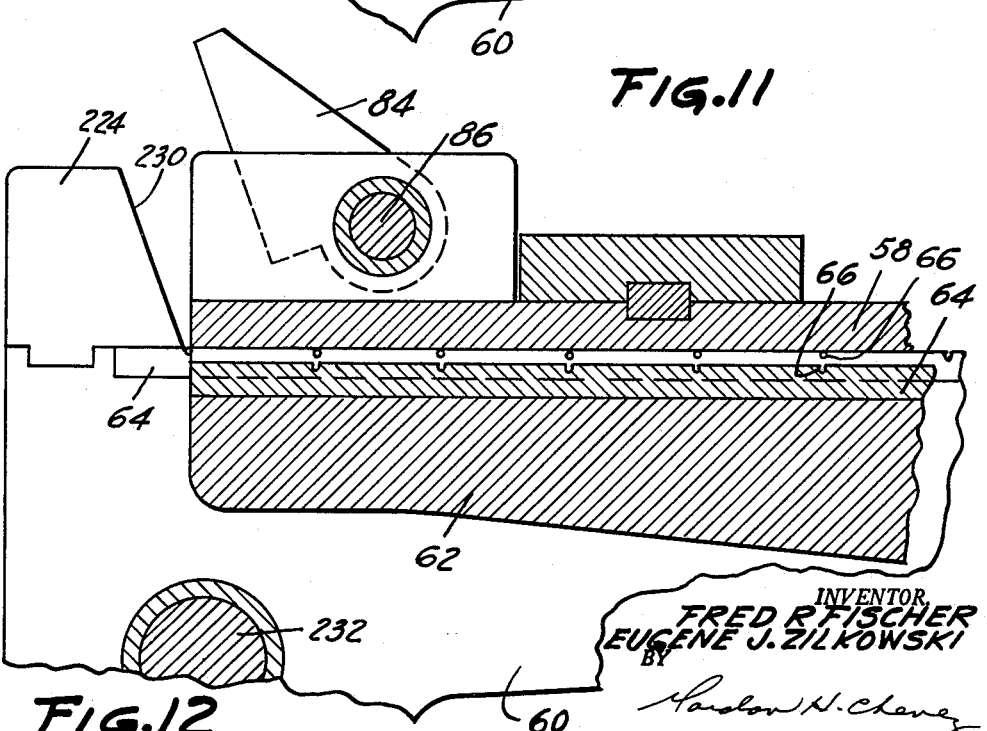
FIGURES 12, 13 and 14 are similar to FIGURE 11 except that the members forming applicants' cable feeding mechanism are shown in the position occupied at different points during the cycle of operation.
Figure 13:
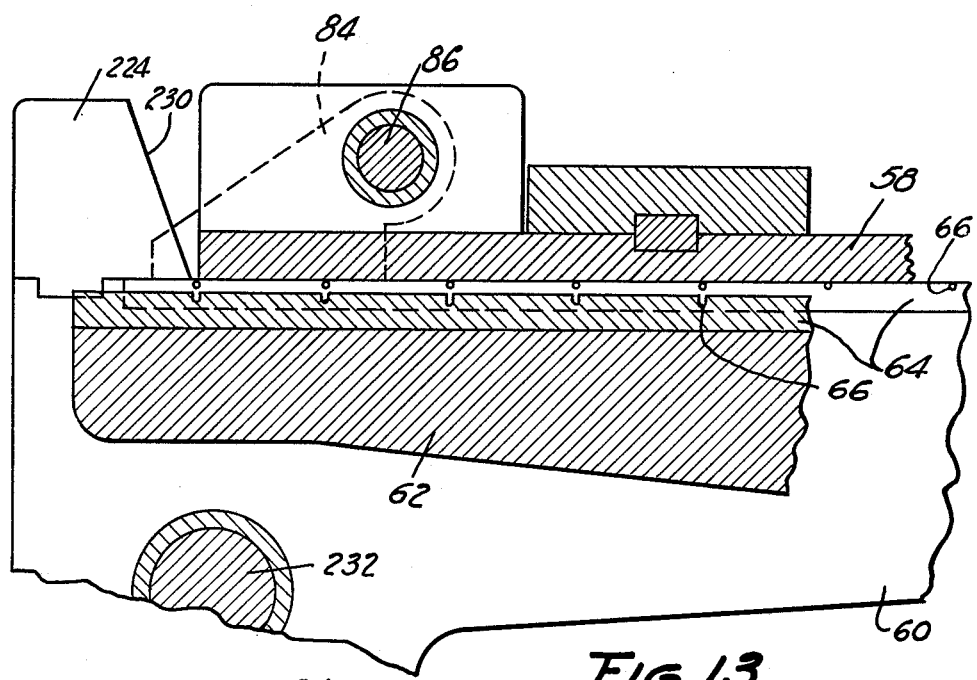
Figure 14:
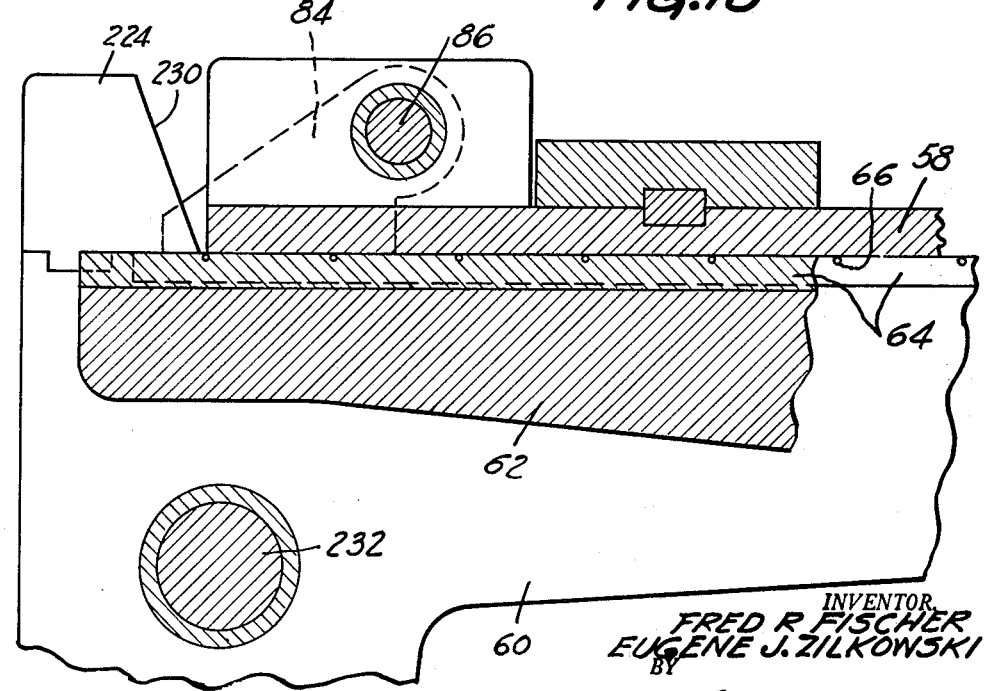

At the uppermost position of the ram portion 40, the lower frame member 78 is positioned to the rear away from the levers 84 and the upper frame member 72 is positioned upward away from the base 32. Switch 200 is actuated by arm 166 to cause energization of solenoid 202 which, in turn, actuates air valve 176 to thereby pressurize air cylinder 178 causing cable engaging levers 84 to assume the open position shown in FIGURE 11. At this time, the machine operator drops a cable 52 into the cable guide recess defined by sloping surfaces 230 and adjacent vertical surfaces of support members 212, 214, and 216 which guide the cable 52 into the recesses 66 in the plates 64 attached to fixed plates 60. The machine operator then trips a switch, not shown, to initiate downward movement of the ram portion 40. As the ram portion 40 moves downward, the automatic feeding mechanism 46 is actuated to effect advancement of the strip steel through the remaining distance between adjacent die. Upon moving downward a distance of approximately one and one-half inches, which distance is for purposes of describing one embodiment only and may vary depending upon length of stroke of the ram portion 40, the ram portion 40 actuates switch 180 closing the same to energize solenoid 178 which, in turn, allows air to enter motor 174 whereupon cam 170 is rotated causing the upper frame member 72 and thus movable plates 62 attached thereto to move downward away from plates 58 for approximately eleven-sixteenths inch. Plates 58 are biased downwardly by springs 240 into engagement with plates 64 which are attached to fixed plates 60 thereby clamping the cables 52 in recesses 66 to maintain the cables 52 in their spaced relationship. As upper frame member 72 approaches the limit of its downward travel, lever 150 engages roller 148 closing switch 132 which, in turn, energizes solenoid 130 causing air valve 128 to open thereby pressurizing motor 126. Closing switch 132 also effects energization of a time delay switch 270. Motor 126 actuates roller 118 thereby moving lower frame member 78 and upper frame member 72 as well as movable plates 62 attached thereto through a distance of approximately one inch away from switch 200 thereby allowing switch 200 to open. Opening switch 200 results in closing movement of cable engaging levers 84 to the position shown in FIGURE 13 whereby the cable 52 is clamped securely in recesses 66 associated with fixed plates 60. At the end of the stroke of approximately one inch, the movable plates 62 are in the position shown in FIGURE 13 at which position the time delay switch 270 opens thereby de-energizing solenoid 142 causing valve 140 to pressurize motor 138 which, in turn, actuates cam 134 thereby raising upper frame member 72 and movable plates 62 attached thereto through the aforementioned travel distance. The upward movement of movable plates 62 results in engagement of recesses 66 associated with plates 62 with the cables 52 whereupon continued upward movement of movable plates 62 results in the cables 52 being clamped between plates 58 and movable plates 62 (FIGURE 14). The plates 58 are biased upward against the springs 240 by movable plates 62 resulting in cables 52 being lifted out of the recesses 66 associated with fixed plates 60.

It will be understood that the above mentioned sequence of operation is accomplished as the ram portion 40 completes its downward travel. Now, as the ram portion 40 begins its upward travel, switch 133 is actuated open upon completion of approximately seven-eighths inch travel of the ram which de-energizes solenoid 130 causing valve 128 to pressurize motor 126 which, in turn, rotates roller 118 causing lower frame member 78, upper frame member 72 and movable plates 62 attached thereto to move rearwardly toward switch 200. The cables 52 which are held in recesses 66 in plates 64 associated with movable plates 62 by plates 58 are advanced accordingly. It will be noted that the plates 64 containing recesses 66 are slidably movable against plates 58 such that the cables 52 are retained in recesses 66. Upon completion of the rearward travel, arm 194 contacts arm 198 which results in energization of solenoid 202 which, in turn, results in actuation of the cable engaging levers 84 to the open position shown in FIGURE 11 as mentioned heretofore. At approximately one and one-half inches upward travel of the ram 40, the automatic feed mechanism 46 is actuated to advance the strip steel one-half the distance between adjacent die.

As the ram portion 40 begins its downward stroke with subsequent downward actuation of upper frame member 72 in the aforementioned manner, one of the cables 52, as shown in FIGURE 1, is in alignment with axis a—a so as to permit the opposite ends of the cable, which cable is of sufficient length to extend a predetermined amount into die portions 34 and 36, to drop into the recesses defined by flanges 268 formed on the hook and eye members 48 and 50. As the movable plates 62 move downward, the cable 52 is retained by recesses 66 associated with fixed plates 60 and held in place therein by plates 58 which are biased downward by springs 240 into engagement with the plates 64 attached to plates 60. The final stamping operation occurs when the ram portion 40 and associated upper die move downwardly into engagement with the lower mating die to effect crimping of the flanges 268 of hook and eye members 48 and 50 over the associated ends of cable 52 simultaneously with the severing of the hook and eye members from their respective steel strip. The assembled hook member 48, eye member 50 and cable 52 is then lifted out of recesses 66 associated with fixed plates 60 by the movable plates 62 in the aforementioned manner as the movable plates complete the next cycle of operation. It will be noted that the assembled hook member 40, eye member 50 and cable 52 is lifted out of the last row of recesses 66 associated with fixed plates 60 by movable plates 62 which plates 62 when moving downward deposit the assembly on an angled portion 272 of fixed plates 60 from which the assembly drops to a chute 274.

Figure 17:
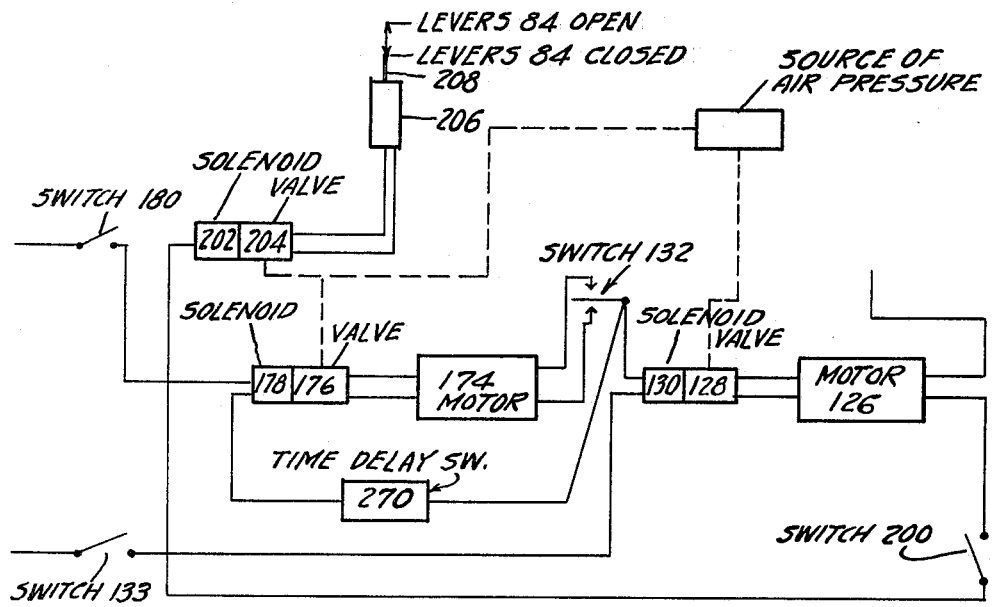
FIGURE 17 shows the control mechanism for the various motor means in schematic form.

FIGURE 17 discloses in diagrammatic form the arrangement of air operated motors and associated switches, solenoids, and valves which control the flow of pressurized air to the motor to accomplish the aforementioned sequence of operation.

Figure 18:
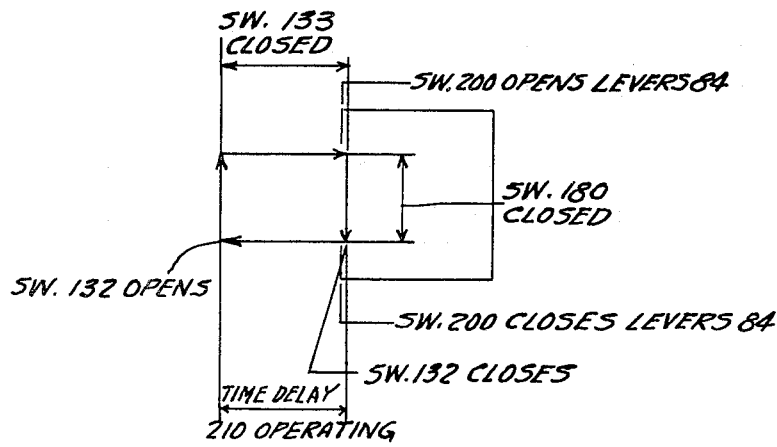
FIGURE 18 shows the path of movement of the movable portion of the cable feed mechanism and the corresponding switch actuation.

FIGURE 18 illustrates the rectangular path of movement of the movable plates 60 and the points at which the various switches are operated.

The fixed and movable plates 60 and 63 may be adjusted along shafts 232, 234, and 66, 68, respectively, to accommodate a cable 52 longer than that shown in the drawings. It will be understood by those persons skilled in the art that either of the die blocks 34 or 36 may be adjustably positioned along axis a—a in a conventional manner to increase the distance between the die blocks. The movable plates 62, fixed plates 60 and plates 58 preferably are arranged to provide three separate units each of which include one fixed plate 60 flanked by two movable plates 62 and one associated plate 58. The three separate units are adjusted to provide equal spacing therebetween thereby compensating for the increase in distance between die blocks 34 and 36.

It will be understood by those person skilled in the art that various modifications of the structure disclosed may be made without departing from the scope of the following claims.

We claim:

1. Automatically operable feed mechanism for use with a stamping press having spaced apart die means fixedly secured to a lower base and cooperating spaced apart die means fixedly secured to a movable ram for stamping two separate members which are adapted to be connected by a cable or the like, the combination of a two part movable frame mounted between said spaced apart die means associated with said lower base and arranged to move horizontally and vertically transversely to the longitudinal axis of said die means, a plurality of vertically extending horizontally spaced fixed first plate members provided with a plurality of spaced apart cable receiving recesses in the upper surfaces thereof between loading and discharge ends thereof, said plurality of first plate members being fixedly secured to the lower base of the press, a vertically extending movable second plate member interposed between adjacent first plate members and provided with a plurality of spaced cable receiving recesses in the upper surface thereof, said two part movable frame having a first part arranged to move horizontally and a second part slidably mounted on said first part for vertical movement relative thereto, first motor means responsive to movement of the ram for controlling the vertical movement of said second part independently of said first part, second motor means responsive to movement of said second part for controlling the movement of said first part, horizontally extending resiliently supported plate means engageable with the upper surfaces of said first and second plate members, cable guide means for supplying one cable at a time to the cable receiving recesses at the loading end of said first plate members, lever means adapted to move into and out of engagement with said first plate members for clamping said supplied cable in position in the recesses, third motor means responsive to movement of said first part for controlling the operation of said lever means to effect said clamping operation, said second plate member being fixedly secured to said first part and actuated vertically thereby such that said supplied cable is engaged by the recesses in said second plate members and displaced vertically away from said first plate members against the resistance of said resiliently supported plate means, said second part being operative to actuate said first part and thus the second plate members carried thereby horizontally to advance said cable to the next series of recesses in said first plate members whereupon said first part is actuated vertically out of engagement with said cable and said cable is retained by said recesses in said first plate members and held in position therein by said resiliently supported plate means, said cable being advanced to a position in alignment with said longitudinal axis whereby the opposite ends of said cable engage their respective stamped members as said first part moves vertically out of engagement with said cable and are fixedly secured thereto by a final stamping operation.

2. Automatically operable feed mechanism for use with a stamping press having spaced apart die means fixedly secured to a lower fixed base and cooperating spaced apart die means fixedly secured to a movable ram for stamping two separate members which are adapted to be connected by a cable or the like, the combination of a movable frame having first and second parts mounted between said spaced apart die means associated with said lower base and arranged to move horizontally and vertically transversely to the longitudinal axis of said spaced apart die means, a plurality of vertically extending horizontally spaced fixed first plate members provided with spaced apart cable receiving recesses in the upper surfaces thereof, vertically extending horizontally spaced movable second plate members alternately arranged with said first plate members and provided with spaced apart cable receiving recesses in the upper surfaces thereof, first motor means responsive to movement of said movable ram for initiating movement of said first part of said movable frame member in a vertical direction to the bottom of its stroke, second motor means responsive to movement of said first part to the bottom of its stroke, for controlling movement of said movable frame in a horizontal direction to the limit of its stroke in one direction whereupon said first motor means is energized to effect movement of said first part in a vertical direction to the top of its stroke, said semond plate members being fixedly secured to said first part and movable vertically and horizontally in response to movement of said movable frame member, cable guide means operatively connected to said fixed first plate members and operative to supply one cable at a time in position into the cable receiving recesses at a loading end of said fixed first plate members, cable engaging levers movable into and out of engagement with said fixed first plate members to thereby hold said cable in said recesses, said cable engaging recesses in said second plate members being engageable with said cable to thereby lift said cable out of the recesses in said fixed first plate members during the vertical movement of said second plate members to the top of their stroke, resiliently supported plate means operatively engaged with the upper surfaces of said first and second plate members to thereby hold said cable in position in the recesses associated with said first and second plate members, said second motor means being actuated by said first part at the top of its stroke and operative to actuate said movable frame in a horizontal direction in the opposite direction to the limit of its stroke, said first motor means being responsive to movement of said ram and operative to actuate said first part vertically to the bottom of its stroke, said second plate members being actuated accordingly whereupon said cable is engaged by the recesses in said fixed first plate member and held therein by said resilently supported plate means with the opposite end portions of said cable engaging their respective stamped members, said opposite end portions of said cable being fixedly secured to their respective stamped members by a final stamping operation.

3. Automatically operable feed mechanism for use with a stamping press having a lower fixed base to which spaced apart die means are fixedly secured and an upper movable ram portion to which spaced apart die means are fixedly secured, said press being operative to progressively stamp two separate members which are adapted to be connected by a cable or the like, the combination of a movable frame mounted on said lower base between its associated spaced apart die means and arranged to move horizontally and vertically transversely to the longitudinal axis of the spaced apart die means, said movable frame being provided with a horizontally movable first part and a vertically movable second part slidably mounted on said first part, a plurality of vertically extending horizontally spaced first plate members fixedly secured to said lower base each of which plate members is provided with a plurality of equally spaced spaced apart cable engaging recesses in the upper surface thereof, a vertically extending movable second plate member interposed between adjacent first plate members and provided with a plurality of equally spaced spaced apart cable engaging recesses in the upper surface thereof, said second plate members being fixedly secured to said vertically movable second part, cable guide means for introducing one cable at a time to a first row of said recesses associated with said fixed first plate members, lever means movable into and out of engagement with said fixed first plate for holding said cable in said first row of recesses, first motor means responsive to movement of said first part and said ram for controlling the vertical movement of said second part, second motor means responsive to movement of said second part and said ram for controlling the movement of said first part, said first part having a horizontal range of movement equivalent to the distance between adjacent spaced apart recesses in each of said fixed first plate members, said second part and the plurality of second plate members attached thereto having a vertical range of movement whereby the recesses in said second plate members are positioned above and below the level of the recesses in said fixed first plate members, resiliently mounted vertically movable plate means engageable with the upper surfaces of said first and second plate members for holding said cable in said recesses, said first and second motor means being controlled in sequential order in response to movement of the ram and said second part to thereby effect horizontal movement of said first part and said second part attached thereto toward said first row of recesses whereupon said second part is actuated vertically upward relative to said second part to effect engagement of said recesses in said second plate members with said cable, said cable being lifted vertically out of said first row of recesses in said fixed plate members, said first part and said second part carried thereby being actuated horizontally away from said first cam of recesses to effect transfer of said cable to a position over the next succeeding row of recesses in said fixed first plate members whereupon said second part is actuated vertically downward relative to said first part to effect engagement of said succeeding row of recesses in said fixed first plate members with said cable, and third motor means being responsive to movement of said movable frame for actuating said lever means out of engagement with said fixed first plate members to permit entry of another cable into said first row of recesses as the previous cable is transferred to the succeeding row of recesses in said fixed first plate member, said fixed first plate members being arranged such that one row of recesses therein is aligned with the longitudinal axis of said spaced apart die means to permit the opposite end portions of said cable to engage their respective stamped members whereupon said end portions are fixedly secured to said stamped members by a final stamping operation.

4. Automatically operable feed mechanism as claimed in claim 1 wherein the first and second parts of said two part movable frame are actuated by separate cam means driven by said second and first motor means, respectively.

5. Automatically operable feed mechanism for use with a stamping press having spaced apart die means fixedly secured to a lower base and cooperating spaced apart die means fixedly secured to a movable ram for stamping two separate members which are adapted to be connected by a cable or the like, the combination of a two part movable frame mounted between said spaced apart die means associated with said lower base and arranged to move horizontally and vertically transversely to the longitudinal axis of said die means, a plurality of vertically extending horizontally spaced fixed first plate members provided with a plurality of spaced apart cable receiving recesses in the upper surfaces thereof between loading and discharge ends thereof, said plurality of first plate members being fixedly secured to the lower base of the press, a vertically extending movable second plate member interposed between adjacent first plate members and plurality of spaced cable receiving recesses in the upper surface thereof, said two part movable frame having a first part arranged to move horizontally and a second part slidably mounted on said first part for vertical movement relative thereto, motor means operatively connected to said first and second parts for controlling the operation of the same, horizontally extending resiliently supported plate means engageable with the upper surfaces of said first and second plate members, cable guide means for supplying one cable at a time to the cable receiving recesses at the loading end of said first plate members, lever means adapted to move into and out of engagement with said first plate members for clamping said supplied cable in position in the recesses, motor means responsive to movement of said first part for controlling the operation of said lever means to effect said clamping operation, said second plate member being operatively connected to and actuated horizontally and vertically by said first and second parts, respectively, in response to energization of said first named motor means such that said supplied cable is engaged by the recesses in said second plate members and displaced out of engagement with one series of recesses in said first plate members and advanced to the next series of recesses therein against the resistance of said resiliently supported plate means which maintains said cable in position in said recesses, said cable being advanced to a position in alignment with said longitudinal axis whereby the opposite ends of said cable engage their respective stamped members and are fixedly secured thereto by a final stamping operation.

References Cited by the Examiner
UNITED STATES PATENTS

| | | | |
|---|---|---|---|
| 2,592,276 | 4/52 | Hackbarth | 153—1 |
| 2,684,423 | 7/54 | Hipple | 153—1 |
| 3,015,020 | 12/61 | Long | 153—1 |

CHARLES W. LANHAM, *Primary Examiner.*